US011837734B2

(12) United States Patent
Zou et al.

(10) Patent No.: US 11,837,734 B2
(45) Date of Patent: Dec. 5, 2023

(54) OXYGEN REDUCTION CATALYST EMPLOYING GRAPHITE OF NEGATIVE ELECTRODE OF WASTE BATTERY, AND PREPARATION METHOD THEREFOR

(71) Applicants: Guangdong Brunp Recycling Technology Co., Ltd., Foshan (CN); Hunan Brunp Recycling Technology Co., Ltd., Changsha (CN); Hunan Brunp EV Recycling Co., Ltd., Changsha (CN)

(72) Inventors: Ke Zou, Foshan (CN); Dingshan Ruan, Foshan (CN); Changdong Li, Foshan (CN); Yuan Wang, Foshan (CN); Fengmei Wang, Foshan (CN); Lin Wu, Foshan (CN)

(73) Assignee: Guangdong Brunp Recycling Technology Co., Ltd., Guangdong (CN)

( * ) Notice: Subject to any disclaimer, the term of this patent is extended or adjusted under 35 U.S.C. 154(b) by 0 days.

(21) Appl. No.: 17/923,847

(22) PCT Filed: Apr. 21, 2021

(86) PCT No.: PCT/CN2021/088764
§ 371 (c)(1),
(2) Date: Nov. 7, 2022

(87) PCT Pub. No.: WO2021/223597
PCT Pub. Date: Nov. 11, 2021

(65) Prior Publication Data
US 2023/0178757 A1 Jun. 8, 2023

(30) Foreign Application Priority Data
May 7, 2020 (CN) ........................ 202010376942.5

(51) Int. Cl.
*H01M 4/90* (2006.01)
*H01M 10/54* (2006.01)

(52) U.S. Cl.
CPC ....... *H01M 4/9083* (2013.01); *H01M 4/9041* (2013.01); *H01M 10/54* (2013.01)

(58) Field of Classification Search
CPC .. H01M 4/9083; H01M 4/9041; H01M 10/54; B01J 35/1019; B01J 35/1023;
(Continued)

(56) References Cited

U.S. PATENT DOCUMENTS

2004/0236157 A1* 11/2004 Heilgendorff ....... H01M 4/9091 502/162

FOREIGN PATENT DOCUMENTS

| | | | |
|---|---|---|---|
| CA | 2796644 A1 * | 10/2011 | .......... H01M 4/9083 |
| CN | 102974380 A | 3/2013 | |

(Continued)

OTHER PUBLICATIONS

English translation of Written Opinion for PCT/CN2021/088764. (Year: 2021).*

Notification to Grant Patent Right for Invention from related Chinese Patent Application No. 202010376942.5 dated Aug. 3, 2021.

(Continued)

*Primary Examiner* — Patricia L. Hailey
(74) *Attorney, Agent, or Firm* — McCarter & English, LLP

(57) ABSTRACT

The invention pertains to the field of catalysts. Disclosed is a method for preparing an oxygen reduction catalyst employing graphite of a negative electrode of a waste battery. The method comprises the following steps: (1) recovering graphite slag from a waste battery, then performing heat treatment on the graphite slag; (2) performing ball-milling and mixing on the treated graphite slag, an iron salt, and a nitrogenous organic compound to acquire a catalyst precursor; (3) performing carbonization treatment
(Continued)

on the catalyst precursor in an inert gas atmosphere to acquire a carbon-based mixture comprising iron and nitrogen; and (4) dissolving the carbon-based mixture comprising iron and nitrogen in an acid solution, performing filtration and drying, performing carbonization treatment again in an inert gas atmosphere, so as to acquire an oxygen reduction catalyst employing graphite of a negative electrode of a waste battery. The invention uses graphite slag generated in a recovery process of a waste lithium ion battery as a raw material. The graphite slag is widely available, and has low costs. The invention reduces environmental pollution, and has economic benefits.

8 Claims, 3 Drawing Sheets

(58) Field of Classification Search
CPC .......... B01J 23/745; B01J 21/18; B01J 27/24; C01B 32/20; C01B 32/21
USPC .......................................................... 502/185
See application file for complete search history.

(56) References Cited

FOREIGN PATENT DOCUMENTS

| | | | | | |
|---|---|---|---|---|---|
| CN | 103041827 A | * | 4/2013 | | B01J 27/00 |
| CN | 103252250 A | | 8/2013 | | |
| CN | 103599805 A | | 2/2014 | | |
| CN | 105552468 A | | 5/2016 | | |
| CN | 105552468 A | * | 5/2016 | | H01M 10/54 |
| CN | 105680060 A | | 6/2016 | | |
| CN | 106395812 A | * | 2/2017 | | C01B 32/21 |
| CN | 106876728 A | | 6/2017 | | |
| CN | 108879014 A | | 11/2018 | | |
| CN | 109279600 A | | 1/2019 | | |
| CN | 109888318 A | | 6/2019 | | |
| CN | 110767912 A | | 2/2020 | | |
| CN | 111634907 A | * | 9/2020 | | B01J 27/24 |
| CN | 111644189 A | | 9/2020 | | |
| WO | 2017117410 A1 | | 7/2017 | | |

OTHER PUBLICATIONS

International Search Report from related International Patent Application No. PCT/CN2021/088764 dated Jul. 21, 2021.

* cited by examiner

OXYGEN REDUCTION CATALYST EMPLOYING GRAPHITE OF NEGATIVE ELECTRODE OF WASTE BATTERY, AND PREPARATION METHOD THEREFOR

CROSS-REFERENCE TO RELATED PATENT APPLICATIONS

The present application is a 35 U.S.C. § 371 National Stage of International Patent Application No. PCT/CN2021/088764, filed on Apr. 21, 2021, which claims priority to Chinese patent application No. 202010376942.5 filed on May 7, 2020, the content of each application is incorporated by reference herein in its entirety.

TECHNICAL FIELD

The present application belongs to the field of catalysts, and particularly relates to an oxygen reduction catalyst using graphite from waste battery negative electrodes and a preparation method therefor.

BACKGROUND

With the transformation and development of energy, the output of lithium-ion batteries is increasing day by day, and the waste lithium-ion batteries will gradually increase. The waste lithium-ion batteries have harmful impurities which can pollute the environment, and also have many valuable resources and materials, so that it is urgent to recycle and utilize the waste lithium-ion batteries.

At present, some researches have been reported on recycling waste lithium-ion battery positive electrode materials, which mainly adopt hydrometallurgy, pyrometallurgy and other methods to recycle the valuable metals. However, negative electrode materials also have great recycling value. Graphite has good structural ductility at molecular and morphological level, and strong tolerance to acid and base media, so it is a promising catalytic material. However, at present, graphite is usually directly activated and repaired to be continually used as graphite negative electrodes. More and more people realize that it is urgent to prepare useful materials in batteries using waste graphite as a raw material.

Therefore, it is urgent to provide an oxygen reduction catalyst using graphite from waste battery negative electrodes, which has waste graphite as a raw material, simple preparation method, low cost and good economic benefits.

SUMMARY

The present application is to provide an oxygen reduction catalyst using graphite from waste battery negative electrodes, a preparation method therefor and use thereof. The present application adopts graphite particles generated in the recycling process of waste lithium-ion batteries as a raw material, which reduces the cost of catalyst preparation, recycles the resources, reduces environmental pollution, and has both social and economic benefits.

In order to achieve the object, the present application adopts the technical solutions below.

A preparation method for an oxygen reduction catalyst using graphite from waste battery negative electrodes, including the following steps:

(1) collecting graphite particles from waste batteries, and then performing heat treatment on the graphite particles;

(2) ball-milling the graphite particles after heat treatment, an iron salt and a nitrogenous organic compound to obtain a catalyst precursor;

(3) performing carbonization treatment on the catalyst precursor in an inert atmosphere to obtain a carbon-based mixture containing iron and nitrogen; and (4) dissolving the carbon-based mixture containing iron and nitrogen in an acid solution, filtering and drying the same, and performing carbonization treatment in an inert atmosphere again to obtain the oxygen reduction catalyst using graphite from waste battery negative electrodes.

Preferably, the graphite particles in step (1) are prepared by drying, crushing and sieving the waste graphite negative electrodes, and then removing the large particle impurities in the negative electrodes.

More preferably, the drying has a temperature of 50-120° C. and a drying time of 2-12 h, and the sieving is carried out with a 100-400 mesh standard sieve.

Preferably, the heat treatment in step (1) has a temperature of 300-600° C., a heating rate of 1-10° C./min, and a time of 0.5-3 h.

Preferably, the iron salt in step (2) is one of ferric chloride, ferric nitrate or ferric sulfate.

Preferably, the nitrogenous organic compound in step (2) is at least one of melamine, aniline or urea.

Preferably, the graphite particles, the iron salt and the nitrogenous organic compound in step (2) have a mass ratio of 1:(1-5):(1-5).

Preferably, the ball milling in step (2) has a rate of 200-600 rpm and a time of 1-5 h.

Preferably, the inert gas in step (3) and step (4) is $N_2$ or Ar.

Preferably, the carbonization treatment in step (3) and step (4) has a temperature of 600-1100° C., a heating rate of 1-10° C./min, and a carbonization time of 1-5 h.

Preferably, the acid solution in step (4) is one of sulfuric acid, hydrochloric acid or nitric acid, and the acid solution has a concentration of 0.5-3 mol/L.

Preferably, the drying in step (4) has a temperature of 50-100° C. and a drying time of 2-24 h.

An oxygen reduction catalyst using graphite from waste battery negative electrodes is provided, which is prepared by the preparation method.

Preferably, the oxygen reduction catalyst using graphite from waste battery negative electrodes includes graphite with pores and loose structure, a transition metal inside the graphite and a nitrogen source on the graphite surface; the transition metal is at least one of Fe, Co, Mn or Ni; the oxygen reduction catalyst using graphite from waste battery negative electrodes has a surface area of 517.13-700 $m^2 \cdot g^{-1}$, and a particle size of 4-22 m.

A fuel cell is provided, which includes the oxygen reduction catalyst using graphite from waste battery negative electrodes.

Beneficial Effects (1) The present application adopts graphite particles generated in the recycling process of waste lithium-ion batteries as a raw material, which has wide sources and low cost, and can reduce environmental pollution and have good economic benefits.

(2) The present application has simple preparation process, convenient operation, and high product value, and can be applied to mass production of fuel cells.

(3) The oxygen reduction catalyst using graphite from waste battery negative electrodes prepared in the present application has very high catalytic activity. The present application creatively adopts waste graphite negative electrodes as a raw material, and the waste graphite contains a small amount of battery plastic, separators, organic impurities and metal impurities; in the preparing process of the oxygen reduction catalyst using graphite from waste battery negative electrodes, after removing plastic, separators and organic impurities, the remaining metal impurities are transition metals with catalytic activity, such as Fe, Co, Mn and Ni, which can improve the catalytic performance of the catalyst; the carbonization treatment allows the nitrogen and metal doped in the catalyst precursor uniformly loaded on the carbon carrier, so that the catalyst can possess catalytic activity; with the acid treatment, the components without oxygen reduction activity can be effectively removed from the product, and the subsequent carbonization treatment can repair the active sites and improve the activity of the catalyst; thus, the oxygen reduction catalyst using graphite from waste battery negative electrodes has an initial potential of 0.85-0.90 V (vs. RHE), a half-wave potential of 0.65-0.83 V (vs. RHE), and a limiting current density of 4.52-6.42 mA/cm$^2$, which has the comparable catalytic performance of the Pt/C catalyst.

DETAILED DESCRIPTION

Figure 1:
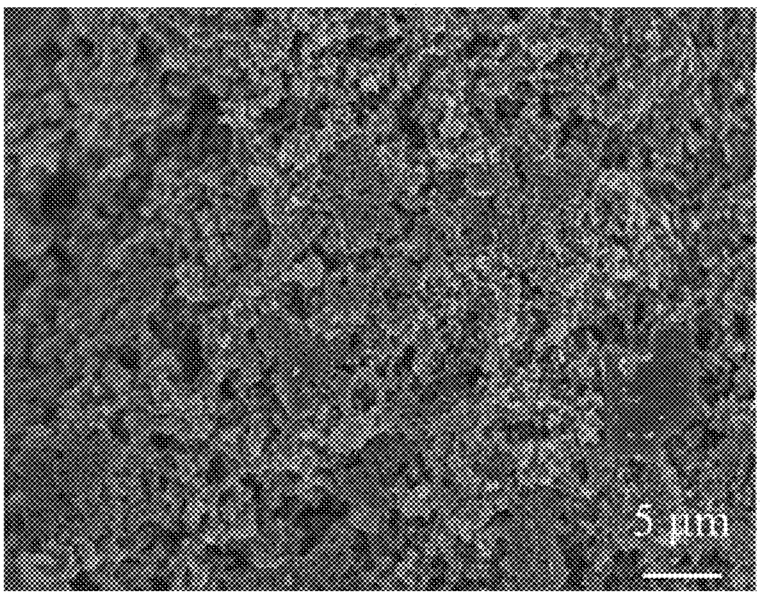
FIG. 1 is an SEM image of the oxygen reduction catalyst using graphite from waste battery negative electrodes in Example 1 of the present application.

In order to make the technical solutions of the present application more clear to those skilled in the art, the embodiments below are described for explanation. It should be noted that the embodiments below have no limitation on the protection scope claimed by the present application.

Unless otherwise specified, the raw materials, reagents or devices used in the embodiments below can be obtained from conventional commercial channels, or can be obtained by the existing methods.

Example 1

In this example, a preparation method for an oxygen reduction catalyst using graphite from waste battery negative electrodes includes the following specific steps:

(1) the collected waste graphite negative electrodes were dried at 65° C. for 6 h, crushed and sieved with a 300-mesh sieve, and large particle impurities in the negative electrodes were removed to obtain negative electrode graphite particles;

(2) the graphite particles was subjected to heat treatment at 400° C. for 2 h with a heating rate of 3° C./min in an air atmosphere to remove the organic impurities in the graphite particles; (3) 4 g of the treated graphite particles, 5 g of $Fe_2(SO_4)_3$ and 5 g of melamine were ball-milled and mixed at a ball milling rate of 350 rpm for 2 h to obtain a uniformly mixed catalyst precursor;

(4) the catalyst precursor was subjected to carbonization treatment at 900° C. for 2 h with a heating rate of 5° C./min in a $N_2$ atmosphere to obtain a carbon-based mixture containing iron and nitrogen; and (5) the carbon-based mixture containing iron and nitrogen was dissolved in 2 mol/L $H_2SO_4$ solution, filtered, dried at 65° C. for 12 h, and subjected to carbonization treatment at 900° C. for 2 h in a $N_2$ atmosphere to obtain the oxygen reduction catalyst using graphite from waste battery negative electrodes.

Example 2

In this example, a preparation method for an oxygen reduction catalyst using graphite from waste battery negative electrodes includes the following steps:

(1) the collected waste graphite negative electrodes were dried at 80° C. for 4 h, crushed and sieved with a 400-mesh sieve, and large particle impurities in the negative electrodes were removed to obtain negative electrode graphite particles;

(2) the graphite particles was subjected to heat treatment at 350° C. for 3 h with a heating rate of 2° C./min in an air atmosphere to remove the organic impurities in the graphite particles;

(3) 4 g of the treated graphite particles, 4 g of $FeCl_3 \cdot 6H_2O$ and 4 g of melamine were ball-milled and mixed at a ball milling rate of 350 rpm for 2 h to obtain a uniformly mixed catalyst precursor;

(4) the catalyst precursor was subjected to carbonization treatment at 800° C. for 3 h with a heating rate of 5° C./min in a $N_2$ atmosphere to obtain a carbon-based mixture containing iron and nitrogen; and (5) the carbon-based mixture containing iron and nitrogen was dissolved in 2.5 mol/L HCl solution, filtered, dried at 80° C. for 8 h, and subjected to carbonization treatment at 800° C. for 3 h in a $N_2$ atmosphere to obtain the oxygen reduction catalyst using graphite from waste battery negative electrodes.

Example 3

In this example, a preparation method for an oxygen reduction catalyst using graphite from waste battery negative electrodes includes the following steps:

(1) the collected waste graphite negative electrodes were dried at 70° C. for 3 h, crushed and sieved with a 200-mesh sieve, and large particle impurities in the negative electrodes were removed to obtain graphite particles;

(2) the graphite particles was subjected to heat treatment at 480° C. for 2.5 h with a heating rate of 2° C./min in an air atmosphere to remove the organic impurities in the graphite particles;

(3) 4 g of the treated graphite particles, 8 g of $Fe(NO_3)_3 \cdot 9H_2O$ and 5 g of melamine were ball-milled and mixed at a ball milling rate of 450 rpm for 2.5 h to obtain a uniformly mixed catalyst precursor;

(4) the catalyst precursor was subjected to carbonization treatment at 1000° C. for 1 h with a heating rate of 3° C./min in an Ar atmosphere to obtain a carbon-based mixture containing iron and nitrogen; and (5) the carbon-based mixture containing iron and nitrogen was dissolved in 1.5 mol/L $HNO_3$ solution, filtered, dried at 70° C. for 10 h, and subjected to carbonization treatment at 1000° C. for 1 h in an Ar atmosphere to obtain the oxygen reduction catalyst using graphite from waste battery negative electrodes.

Example 4

In this example, a preparation method for an oxygen reduction catalyst using graphite from waste battery negative electrodes includes the following steps:

(1) the collected waste graphite negative electrodes were dried at 120° C. for 2 h, crushed and sieved with a 300-mesh sieve, and large particle impurities in the negative electrodes were removed to obtain graphite particles;

(2) the graphite particles was subjected to heat treatment at 360° C. for 3 h with a heating rate of 2° C./min in an air atmosphere to remove the organic impurities in the graphite particles;

(3) 4 g of the treated graphite particles, 10 g of $FeCl_3 \cdot 6H_2O$ and 8 g of melamine were ball-milled and mixed at a ball milling rate of 450 rpm for 2.5 h to obtain a uniformly mixed catalyst precursor;

(4) the catalyst precursor was subjected to carbonization treatment at 1100° C. for 1 h with a heating rate of 3° C./min in an Ar atmosphere to obtain a carbon-based mixture containing iron and nitrogen; and (5) the carbon-based mixture containing iron and nitrogen was dissolved in 1.5 mol/L $H_2SO_4$ solution, filtered, dried at 120° C. for 5 h, and subjected to carbonization treatment at 1100° C. for 1 h in an Ar atmosphere to obtain the oxygen reduction catalyst using graphite from waste battery negative electrodes.

Example 5

In this example, a preparation method for an oxygen reduction catalyst using graphite from waste battery negative electrodes includes the following steps:

(1) the collected waste graphite negative electrodes were dried at 90° C. for 6 h, crushed and sieved with a 400-mesh sieve, and large particle impurities in the negative electrodes were removed to obtain graphite particles;

(2) the graphite particles was subjected to heat treatment at 450° C. for 4 h with a heating rate of 3° C./min in an air atmosphere to remove the organic impurities in the graphite particles;

(3) 4 g of the treated graphite particles, 8 g of $Fe(NO_3)_3 \cdot 9H_2O$ and 6 g of melamine were ball-milled and mixed at a ball milling rate of 400 rpm for 4 h to obtain a uniformly mixed catalyst precursor;

(4) the catalyst precursor was subjected to carbonization treatment at 950° C. for 3 h with a heating rate of 4° C./min in a $N_2$ atmosphere to obtain a carbon-based mixture containing iron and nitrogen; and (5) the carbon-based mixture containing iron and nitrogen was dissolved in 2 mol/L HCl solution, filtered, dried at 90° C. for 10 h, and subjected to carbonization treatment at 950° C. for 3 h in a $N_2$ atmosphere to obtain the oxygen reduction catalyst using graphite from waste battery negative electrodes.

Comparative Example 1

A preparation method for an oxygen reduction catalyst using graphite from waste battery negative electrodes includes the following steps:

(1) 4 g of commercial graphite, 5 g of $Fe_2(SO_4)_3$ and 5 g of melamine were ball-milled and mixed at a ball milling rate of 350 rpm for 2 h to obtain a uniformly mixed catalyst precursor;

(2) the catalyst precursor was subjected to carbonization treatment at 900° C. for 2 h with a heating rate of 5° C./min in a $N_2$ atmosphere to obtain a carbon-based mixture containing iron and nitrogen; and (3) the carbon-based mixture containing iron and nitrogen was dissolved in 2 mol/L $H_2SO_4$ solution, filtered, dried at 65° C. for 12 h, and subjected to carbonization treatment at 900° C. for 2 h in a $N_2$ atmosphere to obtain the oxygen reduction catalyst using graphite from waste battery negative electrodes.

Performance Test:

The oxygen reduction catalysts with carbon base of graphite from waste battery negative electrodes prepared in the examples 1-6 were tested for their performance according to the methods below.

(1) 6 mg of the catalyst was added into 1 mL of ethanol and Nafion solution with a mass fraction of 5%, in which ethanol and Nafion had a volume ratio of 9:1, and the mixture was subjected to ultrasonic dispersion for 2 hours. 20 μL of the catalyst solution was transferred with a pipette to a rotating disc electrode of a rotating disc with a diameter of 5 mm, and naturally dried in the air.

(2) Electrochemical test was carried out on P3000A-DX electrochemical workstation, using the above electrode as a working electrode, a platinum wire as a counter electrode and an Ag/AgCl electrode as a reference electrode.

(3) The catalyst was tested at a scan rate of 5 mV $s^{-1}$ in 0.1 M KOH solution to obtain the cyclic voltammetric curves in saturated oxygen and the polarization curves at different rotating speeds.

Figure 2:
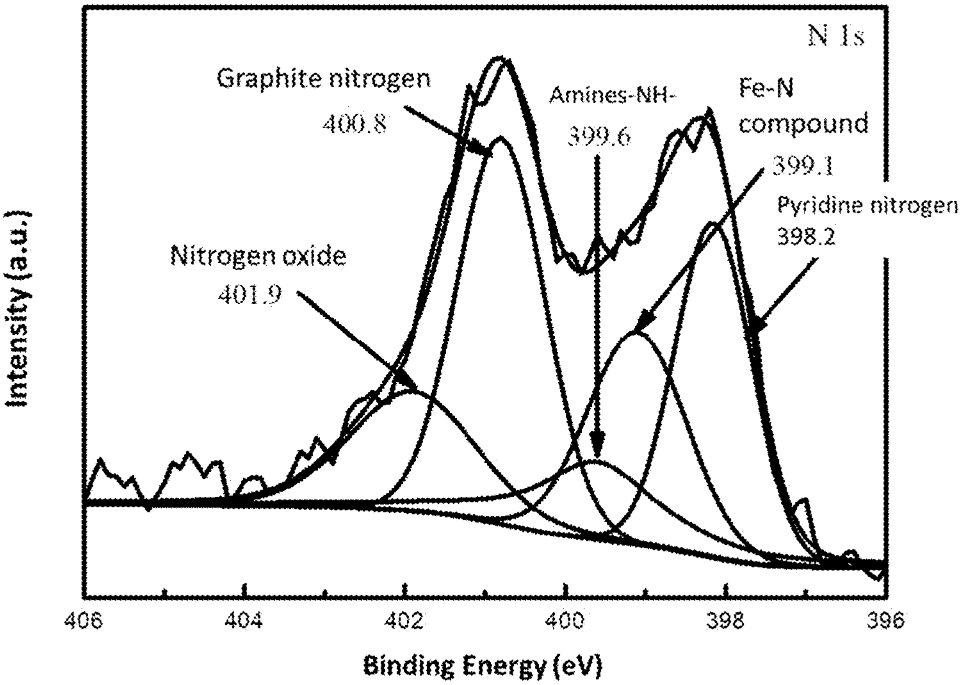
FIG. 2 is a high-resolution XPS spectrum of N1s of the oxygen reduction catalyst using graphite from waste battery negative electrodes in Example 1 of the present application.
Figure 3:
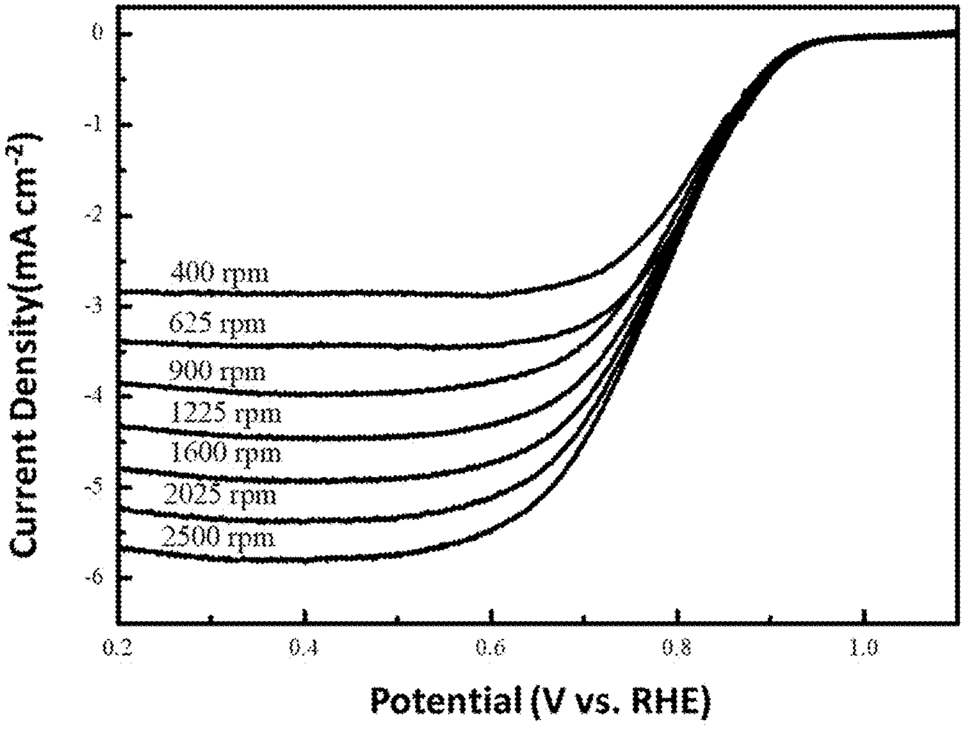
FIG. 3 is polarization curves of the oxygen reduction catalyst using graphite from waste battery negative electrodes in Example 1 of the present application in 0.1 M KOH solution saturated with oxygen at different rotating speeds.
Figure 4:
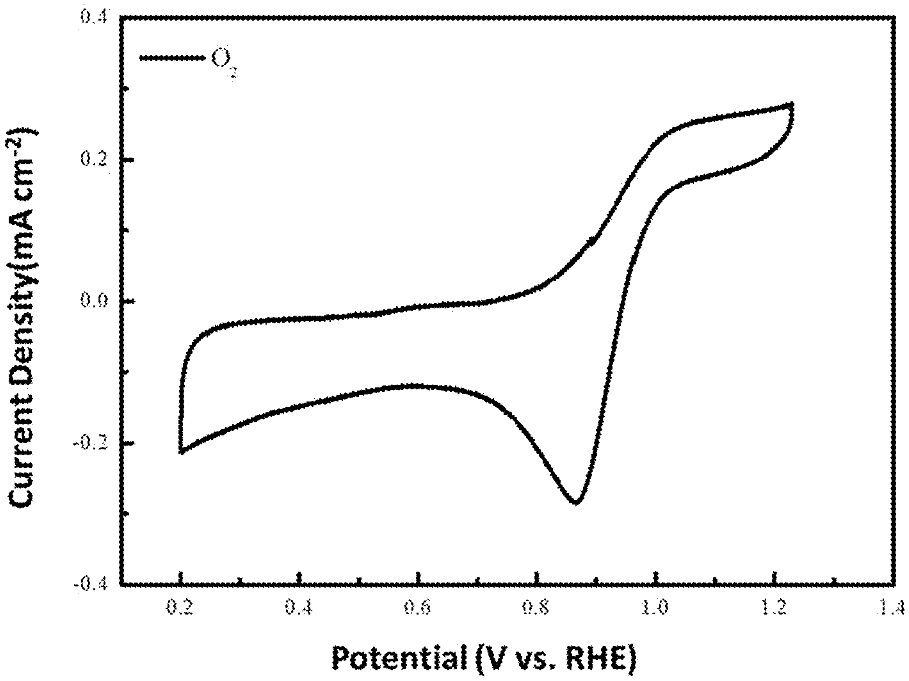
FIG. 4 is cyclic voltammetric curves of the oxygen reduction catalyst using graphite from waste battery negative electrodes in Example 1 of the present application in 0.1 M KOH solution saturated with oxygen.
Figure 5:
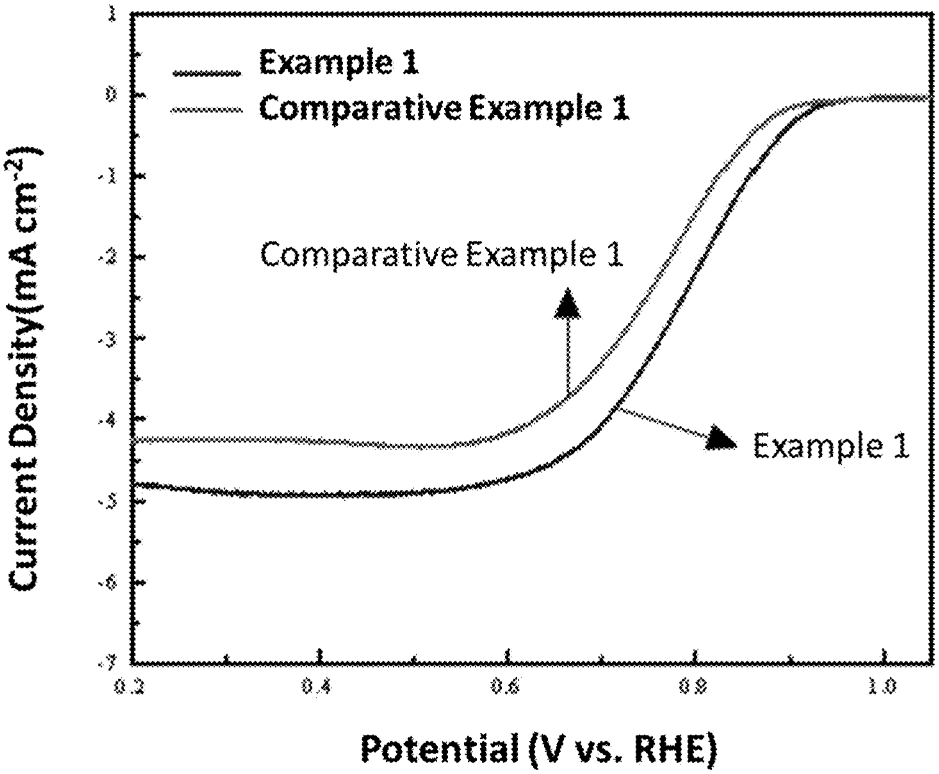
FIG. 5 is oxygen reduction polarization curves of the catalysts prepared in Example 1 and Comparative Example 1 of the present application in 0.1 M KOH solution saturated with oxygen.

FIG. 1 is the SEM image of the catalyst prepared in Example 1 of the present application, FIG. 2 is the high-resolution XPS spectrum of N1s of the catalyst prepared in Example 1 of the present application, FIG. 3 is the polarization curves of the catalyst prepared in Example 1 of the present application in 0.1 M KOH solution saturated with oxygen at different rotating speeds, FIG. 4 is the cyclic voltammetric curves of the catalyst prepared in Example 1 of the present application in 0.1 M KOH solution saturated with oxygen, and FIG. 5 is the oxygen reduction polarization curves of the catalysts prepared in Example 1 and Comparative Example 1 of the present application in 0.1 M KOH solution saturated with oxygen. It can be seen from FIG. 1 that the catalyst prepared in Example 1 of the present application has loose structure and obvious pores on the catalyst surface; it can be seen from the XPS spectrum of FIG. 2 that the catalyst prepared in Example 1 of the present application contains high content of pyridine nitrogen and graphite nitrogen; according to the calculation based on Koutecky-Levich equation, the catalyst prepared in Example 1 of the present application reacts by four-electron transfer mechanism; it can be seen from FIG. 4 that the cyclic voltammetric curves of the catalyst in Example 1 have obvious oxygen reduction peak, which indicates that the catalyst prepared in Example 1 has good catalytic activity for oxygen reduction; it can be seen from FIG. 5 that the initial potential, half-wave potential and limiting current density of the catalyst prepared in Example 1 are all better than those of the catalyst prepared in Comparative Example 1, and the initial potential can reach 0.90 V vs. RHE and the half-wave potential can reach 0.79 V vs. RHE.

The oxygen reduction catalyst using graphite from waste battery negative electrodes and the preparation method therefor provided by the present application are described in detail hereinabove. In this disclosure, the principle and implementation of the present application are described through embodiments. The embodiments are merely used for a better understanding of the methods and concept in the present application, including the optimal example, and the embodiments also enable those skilled in the art to carry out the present application, including fabricating and using any device or system, and implementing any related method. It should be noted that without departing from the principle of the present application, a plurality of improvements and modifications can be made to the present application by those skilled in the art, and these improvements and modifications also fall within the protection scope of the claims of the present application. The protection scope of the present application is defined by the claims, and can include other embodiments which can be thought of by those skilled in the art. If these other embodiments have structural elements that are not different from the literal expressions of the claims, or if they include equivalent structural elements with insubstantial differences from the literal expressions of the claims, these other embodiments should also be included in the scope of the claims.

What is claimed is:

1. A preparation method for an oxygen reduction catalyst using graphite from waste battery negative electrodes, comprising the following steps:

(1) collecting graphite particles from waste batteries, and then performing heat treatment on the graphite particles;

(2) ball-milling and mixing the treated graphite particles, an iron salt and a nitrogenous organic compound to obtain a catalyst precursor;

(3) performing carbonization treatment on the catalyst precursor in an inert atmosphere to obtain a carbon-based mixture containing iron and nitrogen; and (4) dissolving the carbon-based mixture containing iron and nitrogen in an acid solution, filtering and drying the same, and performing carbonization treatment in an inert atmosphere again to obtain the oxygen reduction catalyst using graphite from waste battery negative electrodes;

wherein the graphite particles, the iron salt and the nitrogenous organic compound in step (2) have a mass ratio of 1:(1-5):(1-5).

2. The preparation method according to claim 1, wherein the heat treatment in step (1) has a temperature of 300-600° C., a heating rate of 1-10° C./min, and a time of 0.5-3 h.

3. The preparation method according to claim 1, wherein the iron salt in step (2) is one of ferric chloride, ferric nitrate or ferric sulfate.

4. The preparation method according to claim 1, wherein the nitrogenous organic compound in step (2) is at least one of melamine, aniline or urea.

5. The preparation method according to claim 1, wherein the inert gas in step (3) and step (4) is $N_2$ or Ar; the carbonization treatment in step (3) has a temperature of 600-1100° C., a heating rate of 1-10° C./min, and a carbonization time of 1-5 h.

6. The preparation method according to claim 1, wherein the acid solution in step (4) is one of sulfuric acid, hydrochloric acid or nitric acid, and the acid solution has a concentration of 0.5-3 mol/L.

7. An oxygen reduction catalyst using graphite from waste battery negative electrodes, which is prepared by the preparation method according to claim 1, wherein the oxygen reduction catalyst using graphite from waste battery negative electrodes comprises graphite with pores, a transition metal inside the graphite and a nitrogen source on the graphite surface; the transition metal is at least one of Fe, Co, Mn or Ni; the oxygen reduction catalyst using graphite from waste battery negative electrodes has a surface area of 517.13-700 $m^2 \cdot g^{-1}$, and a particle size of 4-22 μm;

the graphite from waste battery negative electrodes contains battery plastic, separators, organic impurities and metal impurities; and the transition metal is a remaining metal impurity uniformly loaded on the oxygen reduction catalyst with catalytic activity after removing some of the metal impurities in a preparation process for the oxygen reduction catalyst using graphite from waste battery negative electrodes according to claim 1.

8. A fuel cell, comprising the oxygen reduction catalyst using graphite from waste battery negative electrodes according to claim 7.

* * * * *